United States Patent [19]

James

[11] 3,845,831
[45] Nov. 5, 1974

[54] VEHICLE FOR ROUGH AND MUDDY TERRAIN

[75] Inventor: Jesse C. James, Huntsville, Ala.

[73] Assignee: Charles D. Martin, Wharton County, Tex.

[22] Filed: Oct. 16, 1972

[21] Appl. No.: 297,740

Related U.S. Application Data

[63] Continuation-in-part of Ser. No. 62,821, Aug. 11, 1970, abandoned.

[52] U.S. Cl. .............................................. 180/8 F
[51] Int. Cl. ........................................... B62d 57/02
[58] Field of Search ........................... 180/8 B, 8 F; 305/1-5; 301/48, 49, 50; 267/63 R

[56] References Cited
UNITED STATES PATENTS

| 1,155,704 | 10/1915 | Coulter | 305/2 |
| 3,393,751 | 7/1968 | Mascaro | 267/63 R X |

FOREIGN PATENTS OR APPLICATIONS

| 43,237 | 7/1910 | Austria | 301/48 |

Primary Examiner—Leo Friaglia
Assistant Examiner—Randall A. Schrecengost
Attorney, Agent, or Firm—William E. Ford

[57] ABSTRACT

A vehicle according to the present invention is provided with a plurality of legs with which it "walks" rather than rolls across either soft or rough terrain. The legs are carried by a pair of wheel-like drive elements generally referred to as wheels. One of the wheels is rotatably mounted on the vehicle and the other is rotatable about an axis disposed eccentrically with respect to the axis of the first wheel. The legs are pivotally secured to each of the wheels and remain substantially vertical at all times during revolving thereof as the vehicle traverses across the terrain, thereby allowing the legs to enter and exit soft terrain in substantially vertical condition to prevent the application of excessive bending moments to the legs. For application of the vehicle to soft terrain, such as flooded rice fields and the like, the legs are each equipped with feet that normally define a substantially thin silhouette and expand to increase the load supporting cross section thereof upon entering soft soil, such as mud, and engaging firmer subsoil.

4 Claims, 11 Drawing Figures

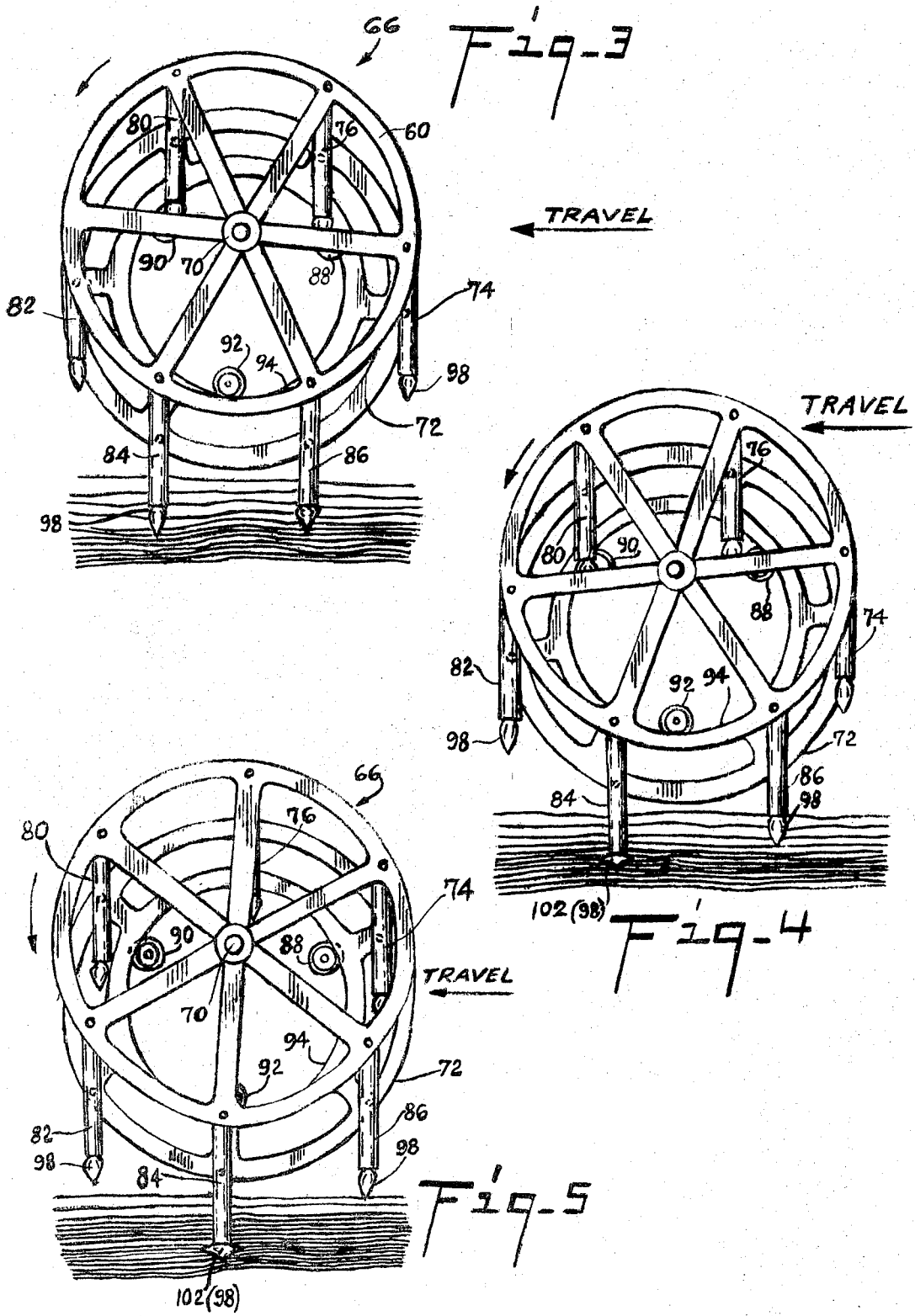

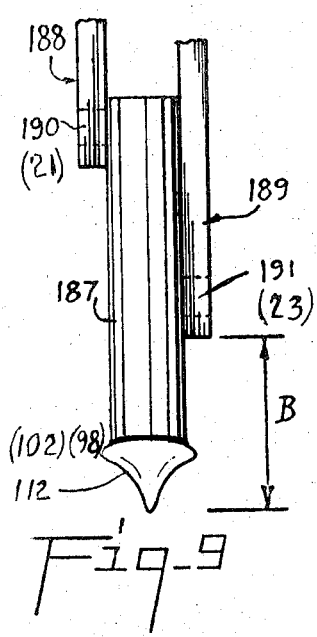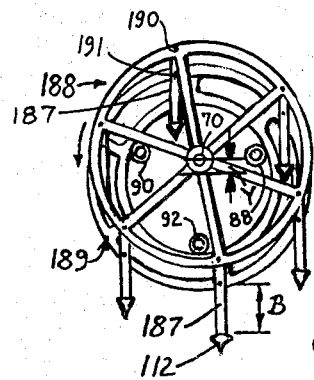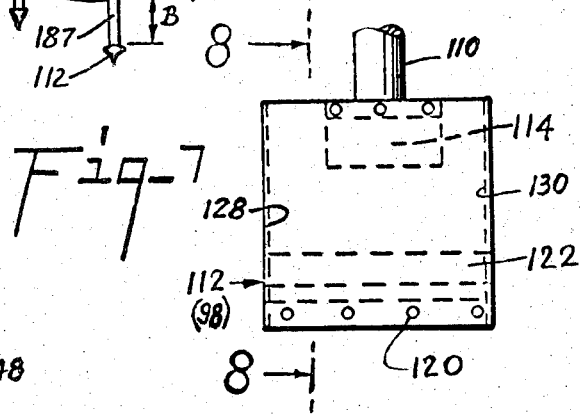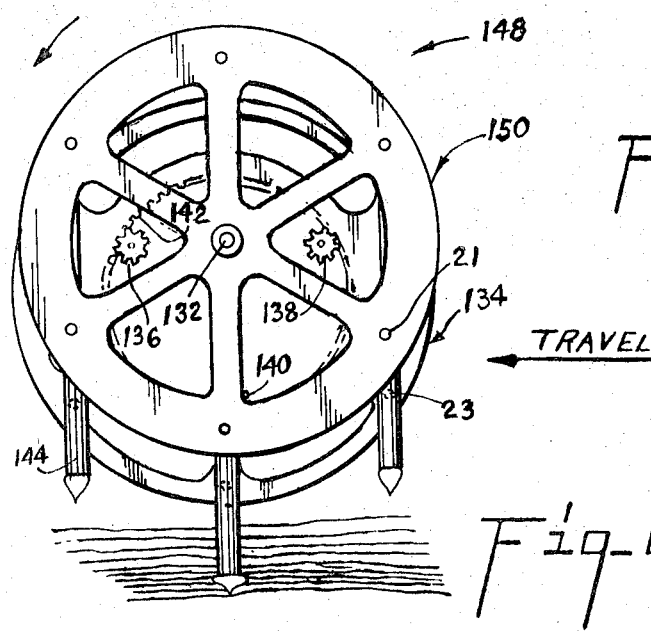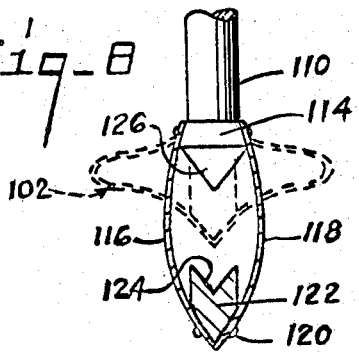

VEHICLE FOR ROUGH AND MUDDY TERRAIN

This application sets forth the operation in detail, and is a continuation-in-part of application Ser. No. 62,821, and now abandoned filed Aug. 11, 1970.

BACKGROUND OF THE INVENTION

The present invention relates generally to vehicles utilized for transportation purposes and more specifically to a particular vehicle construction that is capable of traversing soft terrain such as flooded rice fields and the like with a minimum disturbance of the soil and plants. The invention also relates to a vehicle construction and is adapted for traversing extremely rough terrain in a substantially smooth manner.

Soft terrain such as flooded rice fields generally lacks sufficient soil stability to support most farming vehicles, and yet at times it is necessary for the farmer to gain access to remote areas of a rice field in order to accomplish work such as repairing levees, reseeding specific areas, fertilizing, distributing pesticides, and the like. Ordinary vehicles with broad wheels, such as tractors, that roll across the terrain when the soil is sufficiently stable to support them, tend to damage the growing crops thereby making their use impractical for entering certain fields for purposes of doing work. Flooded rice fields and the like frequently lack sufficient structural stability of the soil to allow traversing of a rolling wheel vehicle, such as a tractor, without the vehicle bogging and becoming stuck.

It is frequently desirable to enter fields where row crops are being grown when the soil is of insufficient structural stability to support a maintenance vehicles or when the crops are in such condition that a wheeled vehicle would tend to damage the plants to an excessive degree. At times a large percentage of row crops are ruined by the inability of the farmer to enter the field and provide the particular attendance that is required.

Vehicles are frequently needed to traverse terrain that is of sufficient roughness to prevent traversing by wheeled vehicles or terrain that is covered with snow to such an extent to make the use of wheeled vehicles impractical.

Many different types of vehicles have been developed to traverse soft or rough terrain but none of these vehicle structures have proven completely satisfactory for employment as a farming vehicle or the like capable of operating in a variety of soil conditions.

In the distant past Coulter U.S. Pat. No. 1,155,704 issued in 1915 to a traction wheel comprised of a rim on a driven shaft and adjacent thereto a large diameter rim that had relative vertical eccentricity with relation thereto with stations about this composite wheel yoke connected to both rims and including spread feet that "walked" on ground surface, foot spread and not penetration having been the object of the structural relic.

A similar patent for traction wheel or apparatus for locomotive purposes had been issued in 1857 to Parkes in British Patent No. 665, which aimed, as did the later American patent to Coulter, at "foot spread" walking. Previously, British Patent No. 12,183 to Miller in 1848 had disclosed a more complex wheel construction, not limited to vertical eccentricity between rims, and with the vehicle thus equipped designed to be animal drawn.

At about the same time the American patent issued to Coulter, Simonek of Bohemia, had obtained German Patent No. 43,237, in 1910 to a device with legs like Coulter's which were not "foot spread" type legs, but which gouged out the earth in traverse, operating on a leverage principle.

On best information and belief, none of these prior art patents ever "caught on" or received any popular usage, probably because automotive power in those ages, had not been developed into the type of motorized prime movers now known to the trade, with great tractive force, but, by virtue of such force, capable of so deeply miring a tire equipped vehicle in rough and muddy terrain, as rice fields.

SUMMARY OF THE INVENTION

The present invention has for an important object the overcoming of the above mentioned difficulties in traversing soft or rough terrain by the employment of a novel vehicle that is capable of moving across soft or rough terrain in a substantially smooth manner without causing noticeable damage to the plants that might be growing in the terrain.

It is another object of the present invention to provide a novel vehicle that is capable of ambulating through fields of crops such as flooded rice fields or row crops and accomplishing desired work in virtually all conditions of the particular terrain involved.

An even further object of the present invention contemplates the provision of a novel vehicle structure capable of traversing muddy or otherwise soft terrain without bogging and becoming stuck.

Among the several objects of the present invention is noted the contemplation of a novel vehicle structure that employs legs terminating in feet structures that are designed to enter the soft surface of the terrain and become supported by the firm subsurface of the terrain.

It is also another object of the present invention to provide a novel vehicle structure that employs leg structures having supporting feet that include expanding or flexible means to provide sufficient surface area in contact with soft terrain to support the vehicle structure without excessive penetration of the terrain.

It is an even further object of the present invention to provide a novel vehicle structure that employs legs for ambulating across terrain and operates with the legs revolving in a substantially vertical condition at all times to insure vertical penetration and exit of the soft terrain to prevent the applicaton of severe bending moments to the leg structures during operation of the vehicle.

A further object of the present invention includes a vehicle structure that is capable of traversing terrain of varying structural stability without involving excessive roughness to passengers and cargo carried by the vehicle.

It is also another object of the present invention to provide a novel vehicle structure capable of traversing soft or rough terrain and being simple in nature, reliable in use, and low in cost.

The above and other objects and novel features of the instant invention will be readily apparent from the following description taken in conjunction with the accompanying drawings. It is to be understood that the drawings are provided only for the purpose of illustration and are not intended to define the limits of the invention but rather merely illustrate preferred embodi-

BRIEF DESCRIPTION OF THE DRAWINGS

In the accompanying drawings forming a part of this specification and wherein like reference numerals are employed to designate like parts:

FIGS. 2, 3, 4 and 5 are elevational views illustrating a modified leg carrying assembly and showing relative movement of the parts as the leg structure is revolved during ambulation of the vehicle.

FIG. 6 is an elevational view of a further modified vehicle leg carrying assembly having parts thereof broken away to show details thereof in full line.

FIG. 7 is a fragmentary elevational view of a leg assembly illustrating the foot portion thereof in its normal or unflexed condition.

FIG. 8 is a fragmentary side elevational view of a leg assembly illustrating the foot portion thereof in the normal or unstressed condition if full line and showing the foot in its maximum deformed condition in broken line.

FIGS. 9 and 10 are, respectively, a larger scale elevational view, partially diagrammatic, showing details of leg construction and penetration; and a smaller scale elevational view, partially diagrammatic, of a wheel assembly of the type shown in FIGS. 2-5, with legs of the type shown in FIG. 9.

BRIEF DESCRIPTION OF THE INVENTION

Briefly, the invention comprises a vehicle construction that is adapted for travel over soft or muddy terrain such as flooded rice fields and the like with a minimum disturbance of the soil and plants. Such a vehicle would be useful also for harvesting or doing other work relative to row crops such as cotton during a rainy season, for traveling over snow covered areas, or for moving over rough or rocky terrain and the like. The vehicle accomplishes traversing of the terrain by ambulation or walking on a plurality of leg members that revolve as the vehicle moves. The basic principle of the device for operation in soft terrain is to provide support for the weight of the vehicle on the firm subsoil but with a minimum of disturbance of plants and the soft upper soil. This is accomplished by providing a thin leg and foot structure that readily penetrates the upper soft layer of the soil in substantially vertical condition and ceases penetration as the subsoil becomes sufficiently dense to support the vehicle structure. To assist in bottoming of the leg and foot, the foot is expandable under pressure so that its load supporting cross section increases as it encounters firm soil. When the load is removed from the foot as the leg is retracted vertically the foot again springs back to a thin silhouette as it is removed, thereby precluding all but minimum adherence between the foot and the soft soil. Soil disturbance is further minimized by maintaining the legs vertical or nearly so at all times.

DETAILED DESCRIPTION OF PREFERRED EMBODIMENTS

Figure 1:
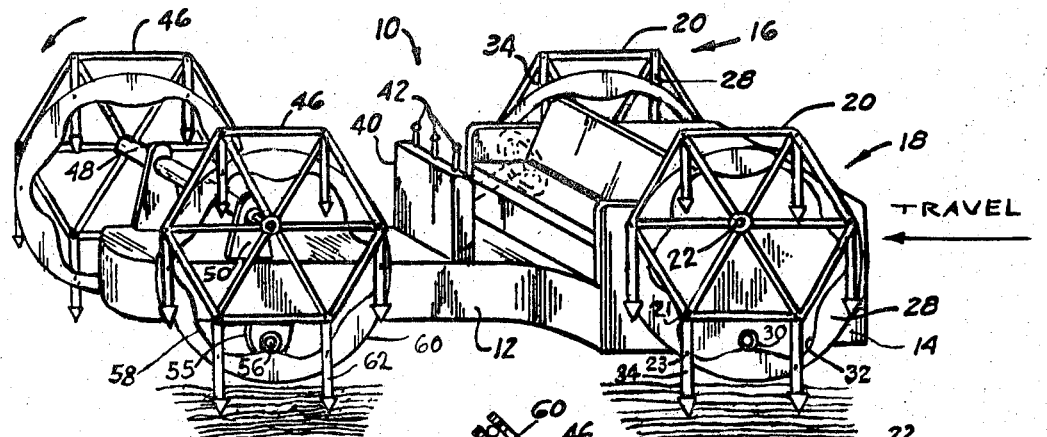
FIG. 1 is an isometric view of a vehicle constructed in accordance with the present invention.

With reference now to the drawings for a better understanding of the present invention, in FIG. 1 is isometrically illustrated a vehicle 10 having a body 12 including an engine compartment 14 having an engine 24 of any suitable character disposed therein. The vehicle 10 is moved across the terrain by rear leg carrying assemblies illustrated generally at 16 and 18 in FIG. 1 that are driven by an engine 24 disposed within the engine compartment 14.

Each of the leg carrying assemblies 16 and 18 comprises frame structures 20 fixed to the extremities of axles 22 that are disposed in driving relation with an engine 24 through suitable gear train mechanisms 26. The gear train mechanisms 26 will be differentially controlled to allow varying rotation of the frame structures 20 during turning of the vehicle. Inner support wheels 28 are disposed between the vehicle body and the frame members 20 and are supported by cam rollers 30 that engage cam surfaces 32 defining the inner periphery of inner support wheels 28. The inner support wheels 28 are also supported by a plurality of leg assemblies 34 that are pivotally connected to the frame members 20 at top, as diagrammatically indicated by reference numeral 21 in FIGS. 1–6. Also, as indicated diagrammatically by reference numeral 23 in FIGS. 1–6, the leg assemblies 34 are pivotally connected to the inner support wheels 28 near the bottoms thereof. The structure of the pivotal connections 21 and 23 will be described in further detail hereinbelow. Connection between the leg assemblies, the inner support wheels, and the frame members is such that the leg members will remain substantially vertical as the frame members and inner support wheels revolve during ambulation of the vehicle.

To ambulate across the terrain, the frame members 20 receive driving and controlling energy from the engine 24 through the gear train mechanism 26. The connection between the frame members 20 and the inner support wheels 28, through the leg assemblies 34, induce rotation of the inner support wheels 28 at the same speed at which the frame members 20 are rotated. The inner support wheels 28 are positioned with the imaginary axes thereof disposed substantially vertically below the axes of the frame members 20, thereby causing the leg assemblies 34 to remain in substantially vertical condition at all times. This feature effectively allows the foot portion of the leg members to enter and exit soft terrain in substantially vertical condition, thereby assuring against the application of severe bending moments to the leg structures.

Figure 1A:
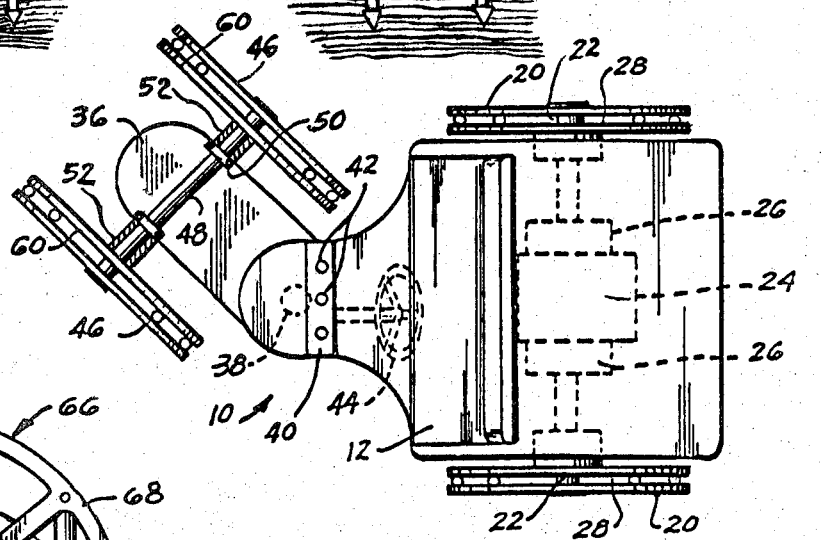
FIG. 1A is a plan view of the vehicle structure of FIG. 1, illustrating articulation of the vehicle steering mechanism.

The vehicle 10 may be provided with a steering arm mechanism 36 that is connected by a pivot assembly to the vehicle body 12. The steering assembly 36 may be articulated relative to the body 12 by any desirable conventional steering mechanism in order to allow turning of the vehicle as it ambulates across the terrain. As illustrated in FIGS. 1 and 1A, the vehicle body 12 is provided with a control console 40 that includes various hydraulic actuation levers 42 to allow control of the vehicle steering mechanism and other mechanical devices, such as a power takeoff, in the event hydraulic control of the vehicle is desired. Also if desired, the control console 40 may be provided with suitable steering wheel structure 44 illustrated in broken line for mechanical articulation of the steering mechanism 36. This particular type of steering mechanism is not intended to limit the present invention since other steering mechanisms may be employed with equal success.

The steering arm mechanism 36 is provided with a pair of frame members 46 that are freely and rotatably secured by conventional bearing assemblies to the extremities of an axle assembly 48. The axle assembly 48 is secured to the articulated steering assembly arm 36 by a pair of posts 50 having suitable axle journal or retention caps 52 bolted or otherwise connected to the posts 50. A pair of flanges 55 depend from the lower portion of the steering assembly arm 36 and are provided with support cam rollers 56 that are disposed in engagement with cam surfaces 58, defining the inner periphery of inner support wheels 60. As in the case of the rear driving assemblies, the front steering assembly is provided with a plurality of leg assemblies 62 that are pivotally connected both to the frame members 46 and to the inner support wheels 60. Also, as described above in regard to the rear driving assemblies, the front inner support wheels 60 are disposed with the imaginary axis thereof substantially vertically below the axis about which the frame members 46 rotate, thereby causing the pivotal connection between the inner support wheels, the frame members and the leg assemblies to maintain the leg assemblies in substantially vertical condition as they rotate during ambulation of the vehicle.

The cam surfaces 32 and 58 cooperate with the cam rollers 30 and 56 to maintain smooth travel of the vehicle 10 as it ambulates across the terrain. As the leg members 34 and 62 revolve into engagement with the terrain, the cam rollers 30 and 56 will be in engagement with the higher portion of the cam surfaces 32 and 58 respectively, as illustrated in FIG. 1. As the vehicle moves forward relative to the leg structure engaging the terrain, there would be a tendency for the vehicle to be raised slightly during this movement. The roller members 30 and 56 will descend toward the lower portion of the cam surfaces 32 and 58, respectively, during this movement to compensate for the tendency of the leg to raise the vehicle, thereby preventing undulation as the vehicle travels.

Figure 2:
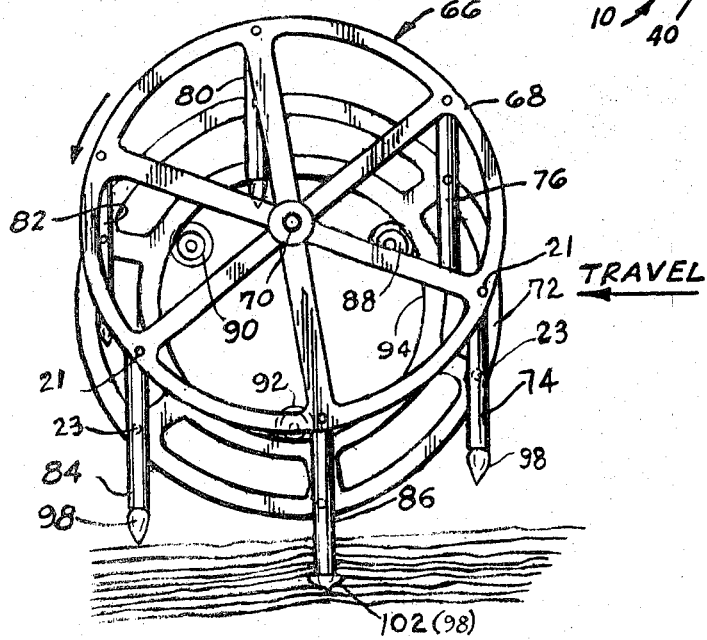

With reference now to FIG. 2, a modified leg carrying assembly, illustrated generally at 66, includes a wheel structure 68 that is connected to the extremity of an axle 70 in the manner described above regarding FIGS. 1 and 1A. A support wheel 72 is disposed adjacent the wheel 68 with the imaginary axis thereof disposed substantially vertically below the axis defined by the axle 70. A plurality of leg assemblies 74, 76, 80, 82, 84 and 86 are pivotally connected both to the outer wheel 68 and to the inner support wheel 72 in such manner that they are retained in substantially vertical relation during simultaneous rotation of the wheels 68 and 72 as the vehicle moves over the terrain. A plurality of support rollers 88, 90 and 92 are rotatably connected to the vehicle body in any suitable manner and are disposed in engagement with the inner peripheral surface 94 of the support wheel 72. The support rollers are flanged to provide sufficient interengagement with the support wheel 72 to provide lateral support for the support wheel.

The leg structures are illustrated in FIGS. 2, 3, 4 and 5 as being comprised of cylindrical or tubular support legs each having a support foot below the lower extremity thereof, with drive wheel 66 outwardly and having the legs pivotally connected to its rim by upper pivots 21, and with the legs pivotally connected inwardly to driven wheel 72 by pivots 23.

As illustrated in FIG. 2, the leg assembly 84 is shown disposed so that the foot 98 thereof is moving downwardly to engage the soft terrain over which the vehicle is travelling. The leg assembly 86 is illustrated with its foot extended to fully spread position 102, after having passed through the soft portion of the terrain to be spread by contact with the relatively hard subportion of the terrain therebelow.

In FIG. 3 the leg assembly 84 is shown as having been disposed, as the vehicle travels leftwardly, in manner that its foot 98 has entered the soft mud or muck of the terrain, while the leg assembly 86, counterclockwise thereof, has started upwardly, to withdraw its foot, so that this foot 98, moving back in the light muck, is beginning to achieve normal position, as no longer under motion downwardly into harder formation.

In FIG. 4 the vehicle further travels toward the left and the leg assembly 84, moved farther counterclockwise, is shown as having been urged further downwardly so that its foot has penetrated the firmer terrain, and has been fully spread, and thus contracted toward minimum elevational dimension in the spread position 102, as indicated.

Meanwhile, the leg assembly 86, counterclockwise thereof, is shown being raised to dispose its foot 98, in upper, softer terrain, so that is is shown in this view as in nearly, if not fully extended, or unspread position. At the same time the leg assembly 82, farthest leftward, moving downwardly, is shown in this view with its foot 98 fully extended, well above, but moving downwardly toward the upper, softer terrain.

In FIG. 5, the vehicle is illustrated in further travel to the left with the leg assembly 84 having been urged to its lowermost point of travel so that its foot has achieved fully spread position 106 in the firmer terrain, prior to ascent of the leg assembly 84, withdrawing its foot 98 upwardly. Also, in this view, the leg assembly 82 is shown as having moved further downwardly to dispose its foot 98 just ready to enter the soft terrain after slight further descent. Meantime, to the rightward, the leg assembly 86 has moved far enough upwardly almost completely to free its foot 98 from the terrain, and thus the foot 98 is indicated as fully extended, or in greatest vertical dimension.

It should be observed that the leg and foot portions of the leg assemblies enter the terrain in substantially vertical condition and remain substantially vertical as the vehicle structure moves relatively thereto. The assembled foot and leg structures termed leg assemblies are then withdrawn in substantially vertical relation from the terrain thereby preventing severe bending moments from being applied to the leg assemblies or legs as the vehicle travels. This feature also causes minimum disturbance of the terrain to prevent damage to plants or the like as the vehicle moves.

With reference now to FIGS. 7 and 8, a leg structure or leg 110 is illustrated having a foot structure 112 secured thereto. These foot structures 112 correspond in construction with the feet 98, at lower ends of respective legs 74, 76, 80, 82, 84 and 86, as described in operative detail in FIGS. 2–5 in context hereinabove set forth. Transverse support member 114 is fixed to the lower extremity of the leg 110 to which is bolted or otherwise fixed a pair of spring members 116 and 118 that are substantially curved in the normal position thereof as illustrated in full line in FIG. 8. The spring members 116 and 118 are secured together at the lower extremity thereof by bolt or rivet members 120 that secure the spring members to a support block 112. The support block is provided with a beveled recess 124 that is disposed for engagement with the beveled lower portion 126 of the support member 114 when the spring members 116 and 118 are deformed to their maximum allowable extent as illustrated in broken line in FIG. 8. As the spring feet 112 enter the soft upper portion of the terrain, the feet will present a substantially thin silhouette for relatively easy insertion of the foot into the terrain. As the foot engages the more rigid substructure of the terrain, the spring members 116 and 118 will deform to the broken line condition thereof, or position 102 as shown in FIG. 8, thereby providing greater surface area for better support of the vehicle structure.

Engagement of the beveled portion 126 of the support member 114 with the beveled recess 124 effectively prevents overstressing of the spring members to the thin silhouette shown in full ine in FIG. 8 so that the foot may be easily withdrawn from the soft terrain. If desired, the foot members may be provided with flexible transverse walls 128 and 130, as shown in broken line in FIG. 7, to prevent introduction of mud or other foreign material within the spring foot assembly. Also if desired the spring foot assembly may be composed of a single substantially V-shaped spring portion instead of utilizing two separate spring portions to form the spring foot.

With reference now to FIG. 6, a modified embodiment of the leg carrying assembly is illustrated generally at 148 with a drive wheel 150 being secured to an axle 132 for rotation. A support wheel 134 is disposed between the drive wheel 130 and the vehicle body with the imaginary axis thereof disposed substantially vertically below the axis defined by the axle 132. A plurality of pinion gears 136, 138, and 140 are rotatably secure to the vehicle body and are disposed for engagement with a large internal gear 142 defining the inner periphery of the support wheel 134. A plurality of leg assemblies 144 are pivotally connected both to the drive wheel 130 and to the support wheel 134 as by upper and lower pivots 21, 23, in order to maintain the leg members in substantially vertical position during revolving thereof as the vehicle traverses the terrain.

As has been set forth hereinabove, reference numeral 21 represents the assembly by which the legs of any of the modifications of FIGS. 1 and 1A, FIGS. 2–5, and of FIG. 6 are pivotally connected near the top thereof to the outer wheel member, element or unit that is revolved by the prime mover driver. Also, in each of these modifications, reference numeral 23 represents the assembly by which the legs thereof are pivotally connected near the bottoms of the legs to the inner wheel member, element or unit that is disposed with a center in space that is vertically in elevation below the axis that revolves the outer wheel unit. The details of construction of the pivots 21, 23 and their relationship to the leg assemblies are shown in larger detail in FIG. 9. Although the modification shown in FIGS. 2–5 is shown in these figures, by way of best illustration, it must be understood that the same structural and mechanical arrangements will apply equally as yell as any other modification with foot disposed below leg to expand laterally or spread in terrain penetration.

Noticeably, in all of these three forms of the invention, FIGS. 1 and 1A, FIGS. 2–5, and FIG. 6, there is in common the feature that in each form the support wheel is kept in position by contact of chassis supported elements that support relative movement around such elements by moving contact maintained between them and the inner peripheral surface of the support wheel inner rim.

In the form of invention shown in FIGS. 1 and 1A this surface 58 comprises an undulating cam surface to counterbalance the undulations of rough and muddy terrain transit. In the form of the invention shown in FIGS. 2–5, this surface 94 is round or circular predicated upon the theory that constant, evenly spaced roller contact with support wheel, in less rigorous circumstances, may substitute smoothness and evenness of performance for any discomforts of travel over especially undulatory ground.

Also, in the form of invention shown in FIG. 6, where engagement is between the teeth of pinions 136, 138, 140, and planetary gear rack teeth 142, positive engagement and accompanying attenuation of undulation may justify usage of this form of contact between support wheel and contacting elements. In every case, as above analized, the contact between chassis mounted elements is with inner peripheral surface of the inner rim of the support wheel.

As to the use of the hydraulic fluid system 186, the result is that the piston rods or legs having spread feet on the lower ends thereof, provide deeper penetration into the mire together with greater support spread. Also such penetration and spread opposes or minimizes travel undulation or bouncing of the "walked" vehicle. The inventions have various applications and selection of arrangement that are dependent upon the exigencies of the terrain to be traversed.

The invention can be practiced without the use of any additional means other than those shown hereinabove, and an ample leg penetration is obtained, in cases, as shown, as by employing legs of tubular or bar stock, or of closed ended pipe, with the spread feet attached directly to the lower ends of this type of legs. Such a typical leg is shown in FIG. 9, the leg 187 being comprised of bar stock or of pipe with at least lower end closed. A foot 112, FIG. 9, constructed in correspondence with the foot 112, as shown in FIGS. 7 and 8, may be attached directly to the lower end of the leg 187. This foot 112 is shown spread and corresponds with the spread foot positions or configurations 102, of the legs 98, FIGS. 2–5. The outer wheel 188 of the wheel unit comprising the wheel attached to the axle, (66 in FIGS. 2–5), and rotated therewith, may be pivotally connected to the upper end of the leg 187 by the provision of a simple upper pivot 190, (21 in FIGS. 2–5), of cylindrical stock. In like manner a lower pivot 191, (23 in FIGS. 2– 5), may be provided, also of cylindrical stock, to provide the pivotal connection between leg 187 and the inner or support wheel 189, (72 in FIGS. 2–5). In this case a vertical dimension B indicates maximum obtainable leg penetration. This type of construction is definitely less expensive than more complicated forms of the invention that involve more complicated pivots and leg operative equipment.

FIG. 10 shows in side elevational view a dimension Y illustrative of the vertical eccentricity between the outer, upper wheel 188 and the lower, support wheel 189. It can be seen that in the wheel unit comprised of outer wheel 188, mounted on drive axle 70, and of support wheel 189, that rotates as restrained by rollers 88, 90, 92, supported from the vehicle frame, not shown, (but in correspondence with inner wheel support shown in FIG. 1), the vertical eccentricity Y between wheel centers is a function of the vertical distance that the respective upper and lower pivots 190, 191, of a leg 187 may be spaced apart in the rims of the respective upper, outer wheel 188, and lower, inner wheel 189. Then the length that a leg 187 may extend below the lower pivot, (a function of depth of penetration B), is determined by the distance from the lower pivot, at uppermost travel, and safe clearance of the full elevation of the foot 112, at the bottom of the leg, to pass over the drive axle 70. As the foot 112, in this construction, can be attached directly to the substantially broad dimension or diameter of the leg 187 at its base, a relatively large dimension type foot 112 may be employed. Also, a relatively large diameter penetration of the marshy formation, by the leg, follows the downwardly wedged penetration of such sizeable foot 112.

The disclosure introduces a novel vehicle structure for traversing extremely soft or rough terrain in a substantially smooth manner, the contemplated terrain especially considering flooded rice fields. Traverse is accomplished with a minimum disturbance of the soil, while permitting the vehicle operators to gain access to remote and heretofore places difficult to approach.

A number of modifications or variations of the invention have been illustrated, but it is anticipated that other structures may be provided within the broad scope and spirit of the invention to accomplish similar results. The appended claims are illustrative and by way of introduction, and not by way of limitation.

We claim:

1. A vehicle for traversing soft terrain comprising a vehicle body having a plurality of leg carrying mechanisms movable supported thereon, each leg carrying mechanism comprising a first wheel being rotatably secured to said vehicle, a second wheel being disposed adjacent to said first wheel, a plurality of legs, supported by each of said leg carrying mechanisms and being movable substantially vertically upwardly and downwardly and simultaneously revolving with said leg carrying mechanisms, said legs serially engaging the terrain over which said vehicle is moving said propelling said vehicle across said terrain, said legs being connected at different points thereon to each of said wheels, whereby said second wheel is rotatable about an axis that is spaced from the axis of said first wheel, at least one roller member rotatably supported by said vehicle, and roller engaging surface means formed on said second wheel and roller member engagement with said roller engagement surface means causing said second wheel to support the weight of said vehicle, and roller member-surface means engagememt cooperating with said legs to achieve smooth traversing of said vehicle over the terrain, each leg providing a spread foot comprising a pair of curved sheet spring members secured to leg lower extremity and joined downwardly along a line of contact, said spring members bending upon entering said soft terrain to spread to a substantially broad foot for adequate support of said vehicle, and spring members collapsing upon withdrawal of said foot from said soft terrain to allow easy removal of said foot from said terrain, said second wheel roller engagement surface means comprising the inner rim surface of said second wheel for roller member cooperation.

2. A vehicle as recited in claim 1; each leg member having its spread foot attached to the lower end thereof.

3. A vehicle for traversing soft and rough terrain comprising a vehicle body, a plurality of leg carrying wheel-like assemblies supporting said vehicle for movement across said terrain, each of said leg carrying wheel-like assemblies comprising a first wheel being rotatably secured to said vehicle, a second wheel being disposed adjacent said first wheel with the axis thereof offset relative to the axis of said first wheel, at least one roller member supported by said vehicle, roller engaging surface means formed on said second wheel, roller member engagement by said roller engaging surface means causing said second wheel to support the weight of said vehicle, a plurality of leg members each being pivotally connected at spaced points thereon to said first and second wheels and being oriented in substantially vertical relation at all times during movement of said wheel-like assemblies, said vehicle having a power source, at least one of said wheel-like assemblies being connected in driving relation with said power source, said vehicle having a steering assembly, each leg member providing a spread foot comprising a pair of curved sheet spring members secured to leg member lower extremity and joined downwardly along a line of contact, said spring members bending upon entering said soft terrain to spread to a substantially broad foot for adequate support of said vehicle, said spring members collapsing upon withdrawal of said foot from said soft terrain to allow easy removal of said foot from said terrain, said second wheel roller engagement surface means comprising the inner rim surface of said second wheel for roller member cooperation.

4. A vehicle as recited in claim 3; each leg member having its spread foot attached to the lower end thereof.

* * * * *